United States Patent [19]

Clark

[11] Patent Number: 4,502,673
[45] Date of Patent: Mar. 5, 1985

[54] INTEGRAL SHOCK ABSORBER AND SPRING ASSEMBLY

[75] Inventor: Ray Clark, Pewaukee, Wis.

[73] Assignee: Applied Power Inc., Milwaukee, Wis.

[21] Appl. No.: 348,133

[22] Filed: Feb. 11, 1982

[51] Int. Cl.³ .............................................. F16F 9/22
[52] U.S. Cl. ................................. 267/64.24; 188/282; 188/287; 188/299; 188/314; 188/318; 188/322.15; 180/89.15
[58] Field of Search ............... 188/269, 282, 281, 285, 188/286, 287, 284, 288, 298, 299, 300, 311, 315, 316, 280, 317, 318, 319, 321.11, 322.11–322.22, 314, 313; 267/8 R, 8 B, 15 A, 34, 64.15–64.28, 11 R, 15 R, 14, 12; 280/702–714, 693; 180/89.14, 89.15; 296/190

[56] References Cited

U.S. PATENT DOCUMENTS

| | | | |
|---|---|---|---|
| 1,295,065 | 2/1919 | Riley et al. | 188/287 |
| 1,313,763 | 8/1919 | Thomas | 188/287 |
| 1,494,135 | 5/1924 | Robison et al. | 188/287 |
| 1,965,473 | 7/1934 | Simon | 188/299 X |
| 2,025,199 | 12/1935 | Funston | 188/315 |
| 2,173,574 | 9/1939 | Binder et al. | 188/287 |
| 2,360,755 | 10/1944 | Boor | 188/286 |
| 2,536,626 | 1/1951 | Coleman | 267/64.23 |
| 2,892,482 | 6/1959 | Beoletto | 267/8 R X |
| 2,893,104 | 7/1959 | Hancock | 267/15 |
| 2,980,441 | 4/1961 | Timpner et al. | 280/693 |
| 3,213,973 | 10/1965 | Damon | 188/287 |
| 3,361,422 | 1/1968 | Theuleau | 188/281 X |
| 3,444,965 | 5/1969 | Dobkins | 188/282 |
| 3,472,547 | 10/1969 | London | 180/89.15 X |
| 3,954,255 | 5/1976 | Keijzer et al. | 267/8 R X |

Primary Examiner—Douglas C. Butler
Attorney, Agent, or Firm—John J. Byrne; Bradford E. Kile; Kevin M. O'Brien

[57] ABSTRACT

Disclosed is a tilt cab suspension system comprising integral shock absorber and air spring assemblies located between the truck frame and the cab. The shock absorber assembly comprises a hydraulic circuit which provides for circulation of hydraulic fluid during an upstroke and/or downstroke of a piston within a cylinder. A selectively adjustable control valve is located in the hydraulic circuit and may be regulated by the vehicle operator to control the stiffness of the shock absorber sub-assembly and, consequently, the hardness of the ride.

11 Claims, 10 Drawing Figures

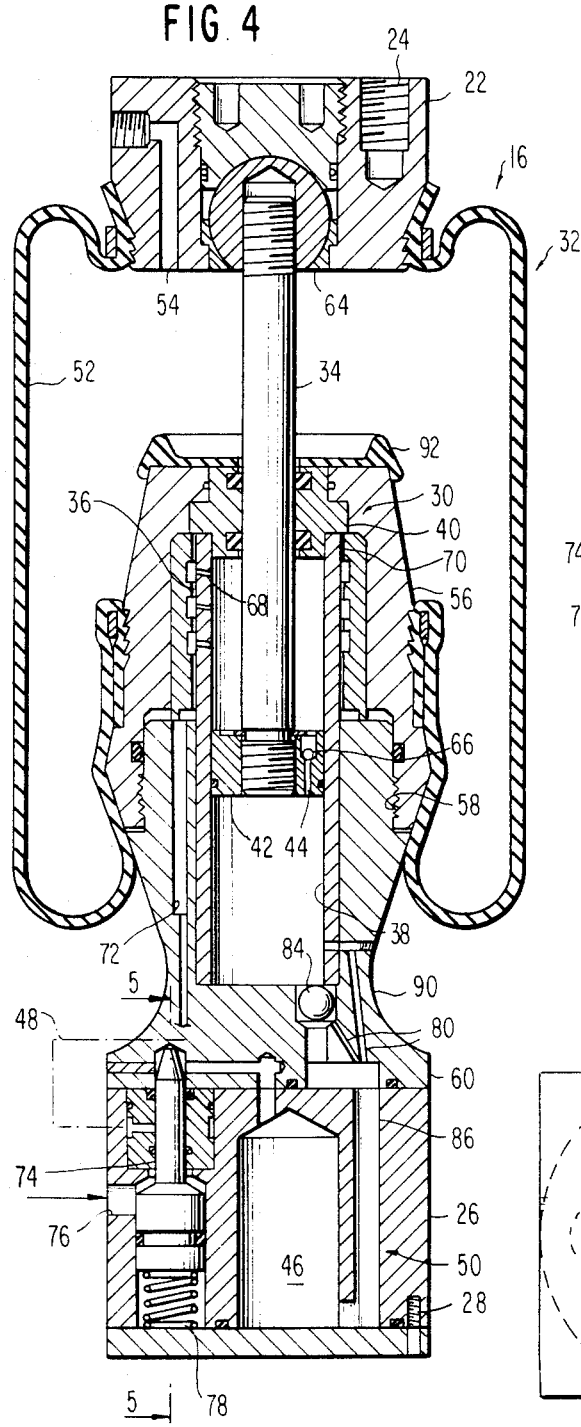
FIG. 4
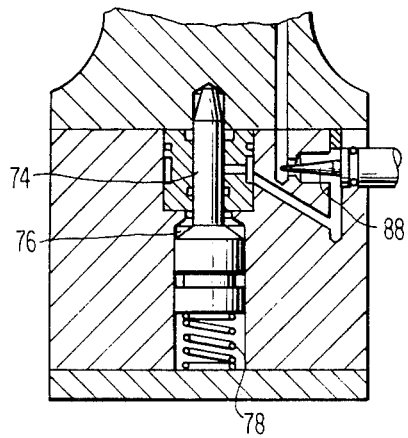
FIG. 5
FIG. 6

INTEGRAL SHOCK ABSORBER AND SPRING ASSEMBLY

TECHNICAL FIELD

This invention relates to suspension systems for tilt cab trucks. Specifically, it relates to the shock absorber and spring components of such systems.

BRIEF SUMMARY OF THE INVENTION

This tilt cab suspension system according to this invention comprises integral shock absorber and air spring assemblies located between the truck frame and the cab. Integral shock absorber and air spring assemblies according to the invention can be located at either the front or the rear of the cab.

An embodiment of the integral shock absorber and air spring assembly specifically adapted to be located at the front of the cab features a hydraulic lock which locks the suspension system in the full down position for the entire tilt cycle. At the start of a cab tilt cycle, the vertical component of force from the tilt cylinder(s) lifts the cab to the top of the suspension members' stroke. In this position the cab is unstable and, as more weight is transferred to the suspension members, there is a danger that one or both sides of the cab may fall through the stroke of the cab suspension. This is particularly likely to occur when the cab is being pulled back from the over-center position, since the tilt cylinders have a force component that pulls down on the suspension members during that portion of the tilt cycle. Damage to the cab and to truck chassis components such as the radiator is likely to occur if the cab falls in this manner. The integral shock absorber and air spring assembly disclosed herein eliminates this problem.

BRIEF DESCRIPTION OF THE DRAWINGS

FIG. 2 is a fragmentary side view of one type of prior art which the present invention improves on.

FIG. 4 is a sectional view of the shock absorber and air spring assembly shown in FIG. 3.

FIG. 5 is a view along the lines of 5—5 in FIG. 4.

FIG. 6 is a bottom plan view of FIG. 4.

DETAILED DESCRIPTION OF THE PRESENTLY PREFERRED EMBODIMENTS

Figure 1:
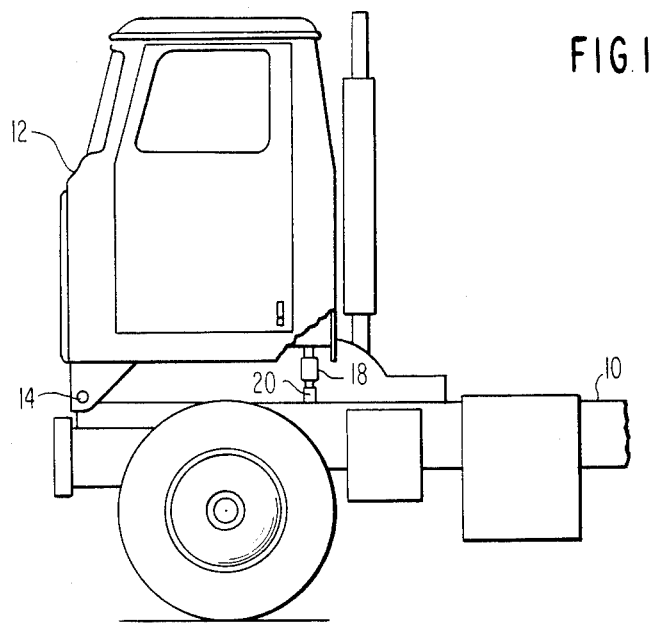
FIG. 1 is a side view of a tilt cab truck incorporating the present invention.
Figure 2:
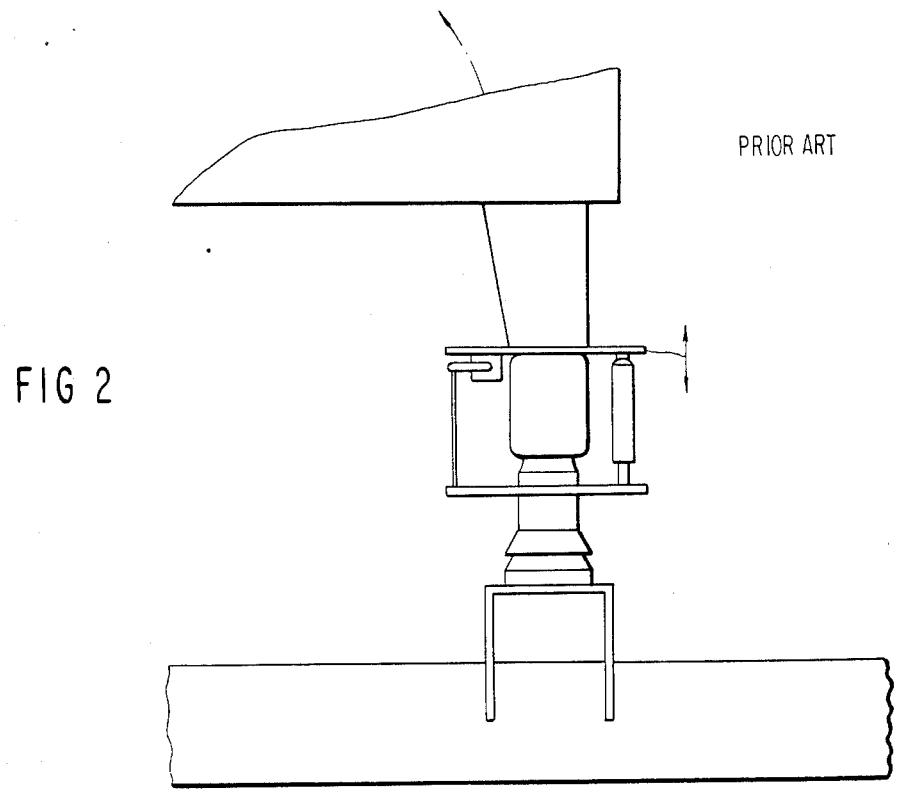
Figure 10:
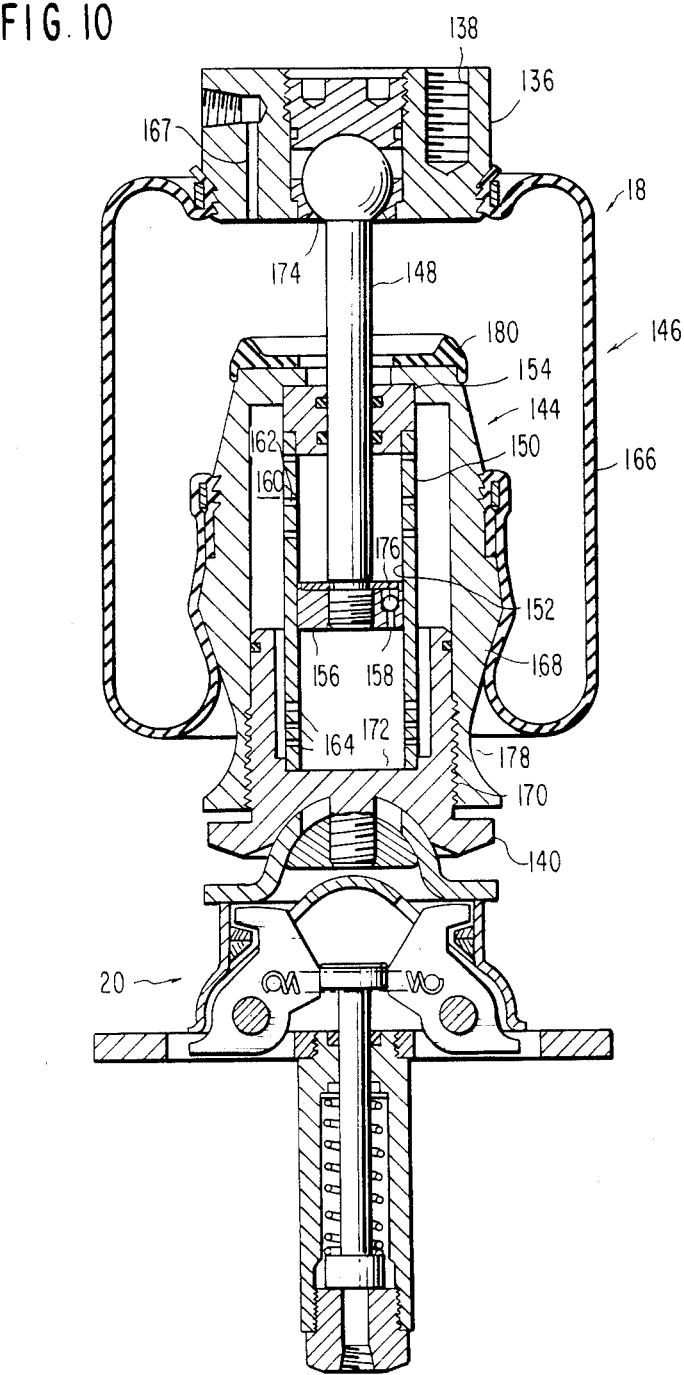
FIG. 10 is a sectional view similar to FIG. 7 of a fourth embodiment of the subject invention.

FIG. 1 shows a conventional tilt cab truck comprising an elongated chassis member 10, a cab member 12 mounted on the chassis member 10 for pivotal movement about an axis 14 transverse to the longitudinal axis of the chassis member 10 from a lowered first position (shown in FIG. 1) to a raised second position. An integral shock absorber and air spring assembly 16 as shown in detail in FIGS. 3–6 is mounted at each of the front corners between the chassis member 10 and the cab member 12 (shock absorber and air spring assembly not shown). An integral shock absorber and air spring assembly 18 as shown in detail in FIG. 10 is located at each of the rear corners between the chassis member 10 and the cab member 12, and a latch mechanism 20 as shown in detail in commonly assigned application Ser. No. 348,141, filed Feb. 11, 1982, now U.S. Pat. No. 4,429,759, issued Feb. 7, 1984, the disclosure of which is hereby incorporated by reference, is located at each of the rear corners between the assembly 18 and the chassis member 10.

Structure of the First Embodiment

Turning to FIGS. 4–6, it will be seen that the shock absorber and air spring assembly 16 comprises a first base 22 adapted to be attached to the cab member 12 by a plurality of bolt holes 24, a second base 26 adapted to be attached to the chassis member 10 by a plurality of bolt holes 28, a shock absorber sub-assembly 30, and an air spring sub-assembly 32.

The shock absorber sub-assembly 30 comprises a rod 34 projecting from the first base 22, a cylinder 36 projecting from the second base 26 and containing a bore 38 closed at the end remote from the second base 26 by a cap 40 through which the rod 34 slidingly projects, and a piston 42 carried by the rod 34 within the bore 38. The piston 42 is preferably in sealing contact with the bore 38, but a first path of fluid communication 44 leads through the piston 42. A reservoir 46 for hydraulic fluids is located in the second base 26, and a second path of fluid communication 48 leads through the cylinder 36 between the reservoir 46 and the bore 38 near the lower end of the stroke of the piston 42.

The air spring sub-assembly 32 comprises an air bag 52 surrounding the rod 34 and the cylinder 36 and a fourth path of fluid communication 54 for communicating air under pressure to and from the air bag 52. The air bag 52 is connected at its upper end to the first base 22 and at its lower end to the second base 26. Alternatively, the air bag 52 could be connected at its lower end to the cylinder 36, but, in this embodiment, the second base 26 comprises an upper component 56 threadedly mounted at 58 on a lower component 60, the air bag 52 is connected to the upper component 56, and the cylinder 36 is mounted on the lower component 60. This configuration permits the lower component 60 and the cylinder 36 to be removed separately for maintenance without disturbing the air spring sub-assembly 32. In the presently preferred embodiment, the fourth path of fluid communication 54 passes through the first base 22 and leads to an external source 62 of high pressure air (shown only in FIG. 3).

Since the assembly 16 is disclosed in the context of a tilt cab truck, the rod 34 is mounted on the first base 22 by means of a universal joint 64 to permit the first base 22 to pivot relative to the rod 34 as the cab member 12 pivots relative to the chassis member 10. However, it will be appreciated that, if the assembly 16 is used in a context where the first base 22 and the second base 26 move only vertically relative to each other, the universal joint 64 can be dispensed with.

The first path of fluid communication 44 has a small cross-sectional area, which restricts the passage of hydraulic fluid through it to a slower flow rate than is possible through the second and third paths of fluid communication 48 and 50. Additionally, a one-way valve 66 which permits upwards flow but which prevents downwards flow is located in the first path of fluid communication 44.

The second path of fluid communication 48 starts with a plurality of axially spaced passageways 68 leading through the cylinder 36 to an annular chamber 70 between the cylinder 36 and the upper component 56 of the second base 26. The purpose of having a plurality of axially spaced passageways 68 is to affect the reaction characteristics of the shock absorber sub-assembly 30. When the piston 42 begins an upwards stroke, all of the passageways 68 are unobstructed by the piston 42, and the flow of the hydraulic fluid is relatively free.

It will be noted that the cross-sectional area of the passageway 68 closer to the cap 40 is smaller than the cross-sectional areas of the passageways 68 farther away from the cap 40, which also contributes to the differential and progressive nature of the damping. Moreover, it will be noted that the uppermost passageway 68 is spaced from the cap 40, so that the incompressible hydraulic fluid will be trapped in the bore 38 above the piston 42 when the piston 42 cuts off the uppermost passageway 68, preventing the piston 42 from striking the cap 40.

The annular chamber 70 communicates with a passageway 72 in the lower component 60 of the second base 26, and the passageway 72 leads to the reservoir 46. A selectively operable valve 74 is located in the passageway 72. Air pilot pressure is communicated to the valve 74 through a passageway 76 in the second base 26, opening the valve 74 against the urging of a spring 78 and permitting flow of hydraulic fluid through the second path of fluid communication 48. However, when the air pilot pressure is turned off, the spring 78 closes the valve 74, blocking the second path of fluid communication 48.

The third path of fluid communication 50 also comprises a plurality of small axially spaced passageways 80 leading through the cylinder 36 from the bore 38, and their axial spacing accomplishes the same purpose as the axial spacing of the passageways 68. However, in this case, another much larger passageway 82 containing a one-way flapper valve 84 which permits upwards flow but which prevents downwards flow is also provided (It should be noted that the passageways 80 are open even when the passageway 82 is closed by the one-way valve 84.). The passageways 80 and 82 join in a single passageway 86 which leads to the reservoir 46.

A further optional feature of the shock absorber sub-assembly 30 is a selectively operable variable orifice mechanism 88 (shown only in FIG. 5) in the second path of fluid communication 48. The mechanism 88 can, for instance, comprise a conical valve actuation of which is under the control of the truck driver, thus permitting the truck driver to control the stiffness of the shock absorber sub-assembly 30.

The second base 26 is formed with an external neck 90 adjacent to the air bag 52, and the air bag 52 is designed so that, when it expands, it expands into the neck 90. This construction permits the external, or radial, dimensions of the air bag 52 to remain approximately uniform as the air bag 52 expands and contracts.

A resilient pad 92 is provided on top of the upper component 56 to cushion the jar when the first base 22 contacts the upper component of the second base 26.

Operation of the First Embodiment

When the truck is travelling over the road, the air bag 52 is inflated, tending to hold the piston 42 in the middle of the bore 38. Air pilot pressure is communicated to the valve 74 through the passageway 76, and the second path of fluid communication 48 is open.

When an unevenness in the road causes the piston 42 to move upwardly in the bore 38, the one-way valve 66 in the first path of fluid communication 44 is closed by hydraulic pressure. Hydraulic fluid exits the bore 38 above the piston 42 through the second path of fluid communication 48 and flows to the reservoir 46. At the same time, fluid from the reservoir 46 flows through the third path of communication 50 (including the passageways 80, 82, and 86) to the bore 38 beneath the piston 42.

Figure 3:
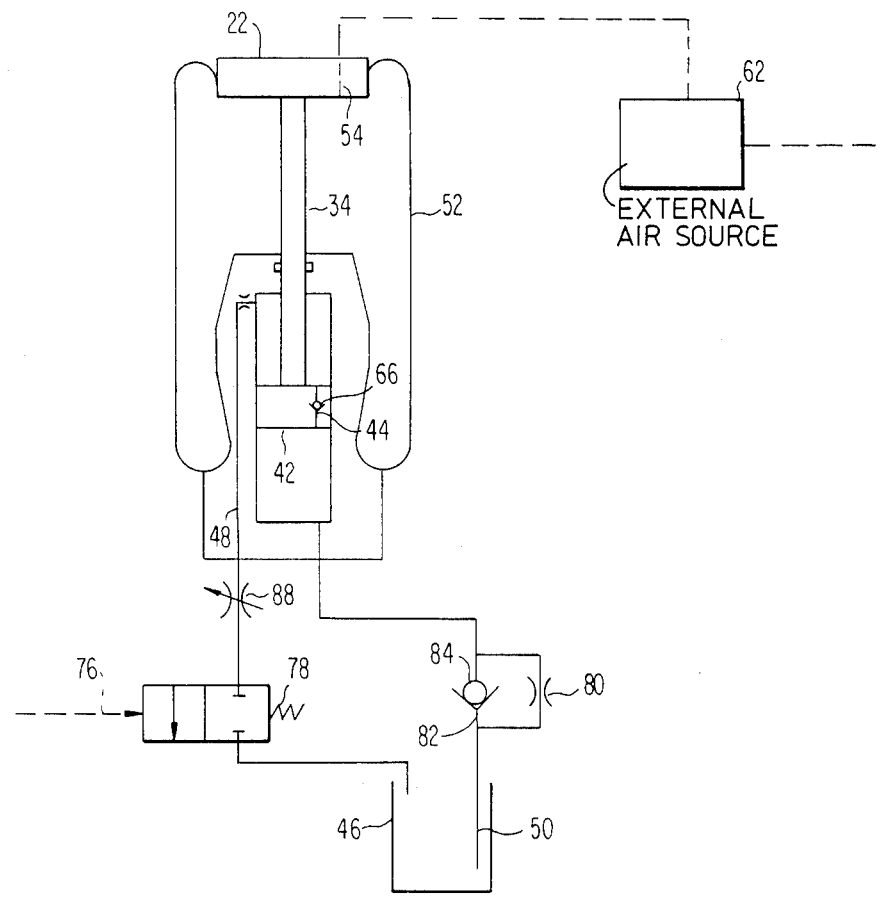
FIG. 3 is a schematic drawing of a first embodiment of the integral shock absorber and air spring assemblies.

When the piston 42 moves downwardly in the bore 38, the one-way valve 66 in the first path of fluid communication 44 is opened by hydraulic pressure. Accordingly, hydraulic fluid exits the bore 38 below the piston 42 both through the first path of fluid communication 44 leading to the bore 38 above the piston 42 and through the third path of fluid communication 50 leading to the reservoir 46. However, downward movement of the piston 42 causes hydraulic pressure to close the one-way valve 84 in the third path of fluid communication 50, which means that hydraulic fluid exits the bore 38 beneath the piston 42 only through first means of fluid communication 44 and passageways 80, both of which are restricted. Since the effective cross-sectional areas of the passageways 80 is much smaller than the effective cross-sectional area of the first path of fluid communication 44, most of the flow from the bore 38 beneath the piston 42 is through the first path of fluid communication 44 to the bore 38 above the piston 42, and, since the rod 34 is coming into the bore 38 above the piston 42, the available volume of the bore 38 beneath the piston 42 decreases faster than the available volume of the bore 38 above the piston 42 increases. The net effect is that hydraulic fluid exits the bore 38 above the piston 42 when the piston 42 is moving downwardly as well as when it moves upwardly. In other words, there is a constant counterclockwise flow through the circuit (as seen in FIGS. 3 and 4); the flow is never clockwise.

Since the effective cross-sectional areas of the second path of fluid communication 48 is smaller than the effective cross-sectional area of the first path of fluid communication 44 (when the one-way valve 66 is open) plus the cross-sectional area of the third path of fluid communication 50 when the one-way valve 84 is closed, the shock-absorber sub-assembly 30 has a larger damping effect when the piston 42 is moving upwardly than when the piston 42 is moving downwardly.

When it is desired to tilt the cab member 12 relative to the chassis member 10, air is drained from the air bag 52, allowing the piston 42 to sink to the bottom of the bore 38, and the air pilot pressure is turned off, allowing the valve 74 to close. Closing the valve 74 blocks the second path of fluid communication 48 and traps hydraulic fluid in the bore 38 above the piston 42. At the same time, the hydraulic fluid in the bore 38 beneath piston 42 forces open the one-way valve 66, filling the gradually increasing volume of the bore 38 above the piston 42. Hydraulic fluid which will not fit in the bore 38 above the piston 42 drains slowly to the reservoir 46 through the passageways 80, the hydraulic pressure having closed the one-way valve 84 in the passageway 82. Since the reservoir 46 must be large enough to accommodate hydraulic fluid displaced by entry of the rod 34 into the bore 38 during the over-the-road travel, there is room in the reservoir 46 for all the hydraulic fluid displaced by the gradual downward movement of the piston 42. Thus, when the piston 42 comes to rest on the bottom of the cylinder 36, the entire bore 38 above the piston 42 and the second passageway 48 above the valve 74 are both filled with hydraulic fluid.

After the piston 42 has come to rest on the bottom of the cylinder 36, the tilt cylinders (not shown) are actuated. As explained previously, in prior art devices actuation of the tilt cylinders lifts the cab member to the top of the suspension members' strokes, thus creating a dangerous situation. As will be readily appreciated, however, the incompressable volume of hydraulic fluid locked above the piston 42 in the present device prevents this from happening.

Structure of the Second Embodiment

Figure 8:
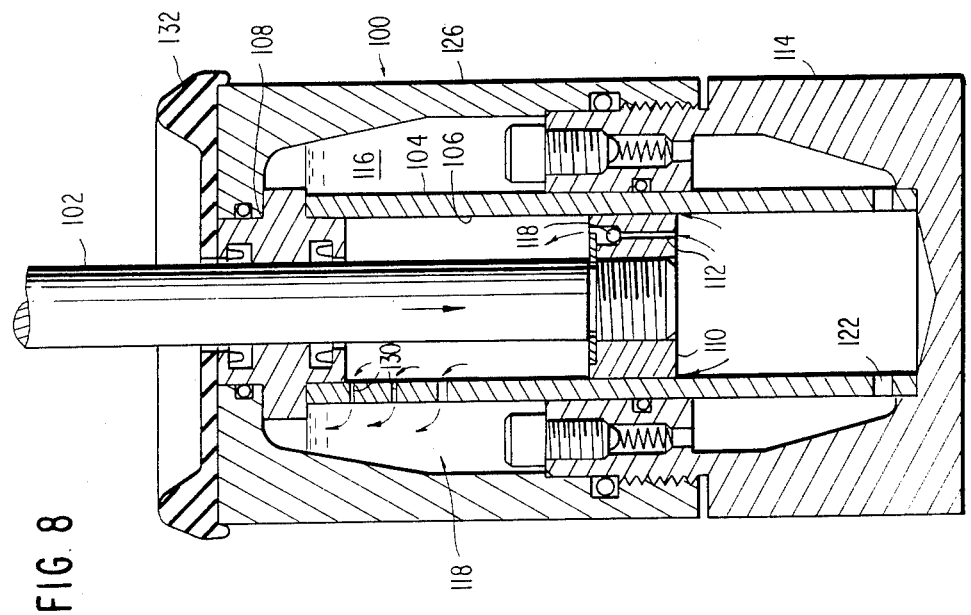
FIG. 8 is a sectional view of the second embodiment showing the piston in downward travel.
Figure 7:
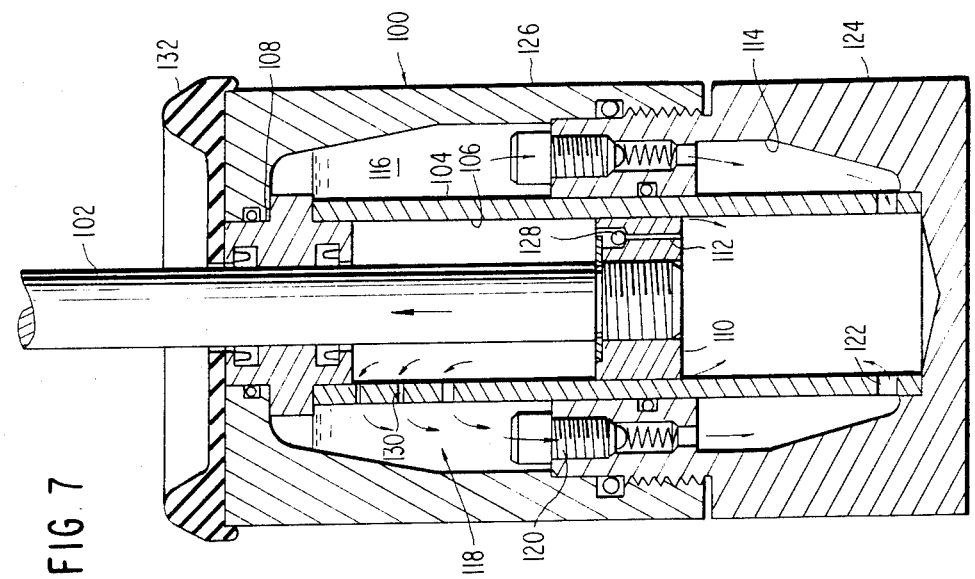
FIG. 7 is a sectional view of the shock absorber sub-assembly of a second embodiment of the subject invention, showing the piston in upward travel.

FIGS. 7 and 8 show only the shock absorber assembly 100 of a second embodiment of the subject invention (air spring not shown).

The shock absorber sub-assembly 100 comprises a rod 102 projecting from the first base (not shown), a cylinder 104 projecting from the second base (not shown) and containing a bore 106 closed at the end remote from the second base by a cap 108 through which the rod 102 slidingly projects, and a piston 110 carried by the rod 102 within the bore 106. The piston 110 is preferably in loosely sliding contact with the bore 106, permitting some peripheral leakage around the piston 110 in either direction of motion of that piston. Additionally, a first path of fluid communication 112 leads through the piston 110.

A reservoir 114 for hydraulic fluid surrounds the cylinder 104 near its lower end, and a reservoir 116 for hydraulic fluid surrounds the cylinder 104 near its upper end. A second path of fluid communication 118 leads from the bore 106 near the cap 108 through the cylinder 104 to the reservoir 116 and through a series of spring operated check valves 120 to the reservoir 114. A third path of fluid communication 122 leads from the reservoir 114 to the bore 106 near the end of the bore 106 remote from the cap 108.

The cylinder 104 is mounted in a lower housing 124 which, together with the exterior of the cylinder 104, defines the reservoir 114, and the cap 108 is mounted in an upper housing 126 which, together with the exterior of the cylinder 104, define the reservoir 116.

The first path of fluid communication 112 has a small cross-sectional area, which restricts the passage of hydraulic fluid through it to a slower flow rate than is possible through the second and third paths of fluid communication 118 and 122. Additionally, a one-way valve 128 which permits upward flow but which prevents downward flow is located in the first path of fluid communication 112.

The second path of fluid communication 118 starts with a plurality of axially spaced passageways 130 leading through the cylinder 104 to the reservoir 116 between the cylinder 104 and the upper housing 126. As with the first embodiment, the purpose of having a plurality of axially spaced passageways 130 is to affect the reaction characteristics of the shock absorber sub-assembly 100. When the piston 110 begins an upwards stroke, all of the passageways 130 are unobstructed, and the flow of hydraulic fluid through the passageways 130 is relatively free. However, towards the end of an upwards stroke, the lower passageways are obstructed by the piston 110, and the flow of the hydraulic fluid becomes much more restricted.

It will be noted that, as with the first embodiment, the cross-sectional area of the passageways 130 closer to the cap 108 is smaller than the cross-sectional areas of the passageways 130 further away from the cap 108, which also contributes to the differential and progressive nature of the damping. Moreover, it will be noted that the uppermost passageway 130 is again spaced from the cap 108, so that incompressible hydraulic fluid will be trapped in the bore 106 above the piston 110 when the piston 110 cuts off the uppermost passageway 130. While there is some peripheral leakage around the piston 110, it is a very small flow, and upperward surges are of very short duration, so that, in practice, the piston 110 is again prevented from striking the cap 108 by the locked hydraulic fluid.

The plurality of spring operated check valves 120 are mounted in the second path of fluid communication 118 where it enters the lower housing 124. The check valves 120 permit hydraulic fluid to flow downwards into the reservoir 114, but do not permit hydraulic fluid to flow upwards from the reservoir 114 into the reservoir 116.

As with the first embodiment, a resilient padding 132 is provided on top of the upper housing 126 to cushion the jar when the first base (not shown) contacts the upper housing 126 (which is fixedly mounted on the second base by means not shown).

Operation of the Second Embodiment

In operation, when an upstroke is caused by a jarring of the truck as it rides over an obstruction, the fluid paths are as shown by the arrows in FIG. 7. That is, hydraulic fluid from the bore 106 above the piston 110 is forced around the piston 110 to the bore 106 beneath the piston 110 to some degree, but it is mostly forced through the passageways 130, the reservoir 116, the check valves 120, the reservoir 114, and the third path of fluid communication 122 to the bore 106 beneath the piston 110.

When the upstroke is completed and the rod 102 begins to settle back down under the force of gravity, the check valves 120 close, and communication from the bore 106 beneath the piston 110 to the bore 106 above the piston 110 is limited to the first path of fluid communication 112 and to peripheral leakage around the piston 110. Since the rod 102 is re-entering the bore 106 during this phase of the operation, the volume of hydraulic fluid which exits the bore 106 beneath the piston 110 exceeds the volume which becomes available for it in the bore 106 above the piston 110, and the excess is forced out through the passageways 130 into the reservoir 116 as indicated by the arrows in FIG. 8.

Third Embodiment

Figure 9:
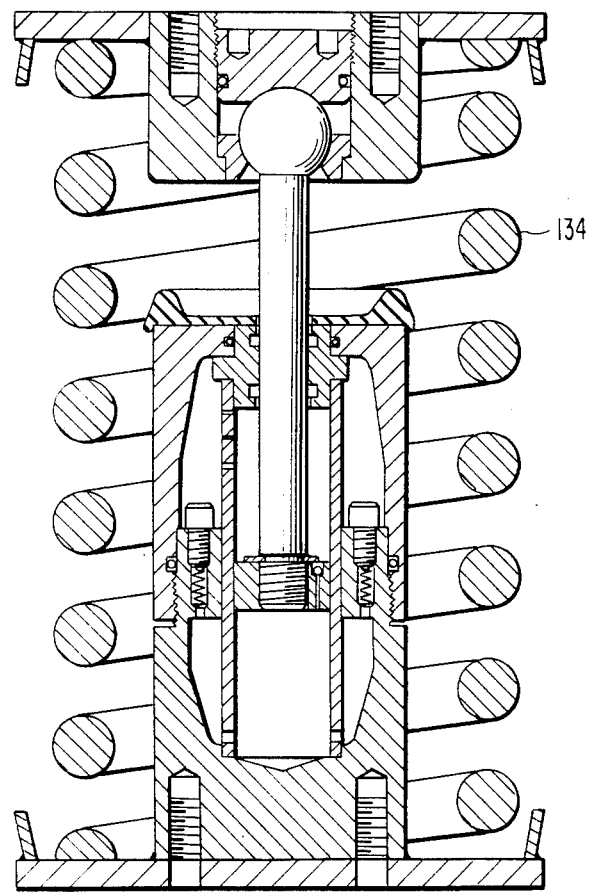
FIG. 9 is a sectional view similar to FIG. 7 of a third embodiment of the subject invention.

The third embodiment, shown in FIG. 9, is identical to the embodiments shown in FIGS. 8 and 9 except that the air bag 52, which functions as a spring, has been replaced with a mechanical spring 134. In this embodiment, means (not shown) must be provided to bring the first base into contact with the second base against the urgings of the spring 134 when it is desired to lock the assembly in the down position prior to tilting the cab member 12.

Fourth Embodiment

A fourth embodiment, particularly adapted for use at the rear corners of the cab, is shown in FIG. 10. It comprises a first base 136 adapted to be attached to the cab member 12 by a plurality of bolt holes 138, a second base 140 adapted to be attached to the latch mechanism 20 by a bolt 142, a shock absorber sub-assembly 144, and an air spring sub-assembly 146.

The shock absorber sub-assembly 144 comprises a rod 148 projecting from the first base 136, a cylinder 150 projecting from the second base 140 and containing a bore 152 closed at the end remote from the second base 140 by a cap 154 through which the rod 148 slidingly projects, and a piston 156 carried by the rod 148 within the bore 152. The piston 156 is preferably in sealing contact with the bore 152, but a first path of fluid communication 158 leads through the piston 156. A reservoir 160 for hydraulic fluids surrounds the cylinder 150, and a second path of fluid communication 162 leads through the cylinder 150 between the reservoir 160 and the bore 152 near the upper end of the stroke of piston 156. A third path of fluid communication 164 leads through the cylinder 150 between the reservoir 160 and the bore 156 near the lower end of the stroke of the piston 156.

The air spring sub-assembly 146 comprises an air bag 166 surrounding the rod 148 and the cylinder 150 and a fourth path of fluid communications 167 for communicating air under pressure to and from the air bag 166. The air bag 166 is connected at its upper end to the first base 136 and at its lower end to the second base 140. Alternatively, the air bag 166 could be connected at its lower end to the cylinder 150, but, in this embodiment, the second base 140 comprises an upper component 168 threadedly mounted at 170 on a lower component 172, the air bag 166 is connected to the upper component 168, and the cylinder 150 is mounted on the lower component 172. This configuration permits the lower component 172 and the cylinder 150 to be removed separately for maintenance without disturbing the air spring sub-assembly 146. In the presently preferred embodiment, the fourth path of fluid communication 168 passes through the first base 136 and leads to an external source of high pressure air (not shown).

Since the assembly 18 is disclosed in the context of a tilt cab truck, the rod 148 is mounted on the first base 136 by means of a universal joint 174 to permit the first base 136 to pivot relative to the rod 148 as the cab member 12 pivots relative to the chassis member 10. However, it will be appreciated that, if the assembly 18 is used in a context where the first member 136 and the second member 140 move only vertically relative to each other, the universal joint 174 can be dispensed with.

The first path of fluid communication 158 has a small cross-sectional area, which restricts the passage of hydraulic fluid through it to a slower flow rate than is possible through the second and third paths of fluid communication 162 and 164. Additionally, a one-way valve 176 which permits upwards flow but which prevents downwards flow is located in the first path of fluid communcation 158.

The second path of fluid communication 162 comprises a plurality of axially spaced passageways leading through the cylinder 150 to the reservoir 160. The purpose of having a plurality of axially spaced passageways is to affect the reaction characteristics of the shock absorber sub-assembly 144. When the piston 156 begins an upwards stroke, all of the passageways are unobstructed, and the flow of hydraulic fluid out of the passageways 162 is relatively free. However, towards the end of an upwards stroke, the lower passageways are obstructed by the piston 156, and the flow of the hydraulic fluid becomes much more restricted.

It will be noted that the cross-sectional area of the passageways comprising the second path of fluid communication 162 close to the cap 154 are smaller than the cross-sectional areas of the passageways farther away from the cap 154, which also contributes to the differential and progressive nature of the damping. Moreover, it will be noted that the uppermost passageway is spaced from the cap 154, so that incompressible hydraulic fluid will be trapped in the bore 152 above the piston 156 when the piston 156 cuts off the uppermost passageway, preventing the piston 156 from striking the cap 154.

The third path of fluid communication 164 also comprises a plurality of small axially spaced passageways leading through the cylinder 150 from the bore 152, and their axial spacing accomplishes the same purpose as the axial spacing of the passageways comprising the second path of fluid communication 162.

The second base 140 is formed with an external neck 178 adjacent to the air bag 166, and the air bag 166 is designed so that, when it expands, it expands into the neck 178. This construction permits the external, or radial, dimensions of the air bag 166 to remain approximately uniform as the air bag 166 expands and contracts.

An elastomeric pad 180 is provided at the top of the upper component 168 of the second base 140 to cushion the jar if the first base 136 comes into contact with the second base 140.

Operation of the Assembly 18

When the truck is travelling over the road, the air bag 166 is inflated, tending to hold the piston 156 in the middle of the bore 152. When an unevenness in the road causes the piston 156 to move upwardly in the bore 152, the one-way valve 176 is closed by hydraulic pressure. Hydraulic fluid exits the bore 152 above the piston 156 through the second path of fluid communication 162 and flows into the reservoir 160. At the same time, fluid flows from the reservoir 160 through the third path of fluid communication 164 into the bore 152 beneath the piston 156. Conversely, when an unevenness in the road causes the piston 156 to move downwardly in the bore 152, the one-way valve 176 is opened by hydraulic pressure. Hydraulic fluid exits the bore 152 beneath the piston 156 through the first path of fluid communication 158. Since the effective volume of the bore 152 beneath the piston 156 is decreased faster than the effective volume of the bore 152 above the piston 156 is increased (due to the presence of the rod 148 in the latter), hydraulic fluid from the bore 152 above the piston 156 is forced through the second path of fluid communication 162 as the piston 156 moves downwardly, causing a counter-clockwise flow (in FIG. 10) of the hydraulic fluid regardless of the direction of motion of the piston 156.

Caveat

While the present invention has been illustrated by a detailed description of several preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. An integral shock absorber and spring assembly comprising:
   a first base;
   a rod projecting from said first base;
   a second base;
   a cylinder projecting from said second base, said cylinder being closed at the end remote from said second base by a cap through which said rod slidingly projects;
   a piston carried by said rod within said cylinder, said piston dividing the interior space of said cylinder into a first bore which decreases in volume during the upstroke of said piston in said cylinder and a second bore which decreases in volume during the downstroke of said piston in said cylinder;
   a hydraulic fluid circuit comprising
      a reservoir for hydraulic fluid,
      a first path of fluid communication through said piston;
      a second path of fluid communication through said cylinder and positioned near an end of said cylinder towards which said piston is directed during an upstroke and operably connected to said reservoir, said second path of fluid communication having a plurality of axially-spaced openings whereby the effective cross-sectional area of the sum of said openings is reduced as said piston nears the end of an upstroke, said second paths of fluid communication permitting a slower flow rate than said first path of fluid communication, and
      a third path of fluid communication through said cylinder and positioned near an end of said cylinder towards which the piston is directed during a downstroke and operably connected to said reservoir, said third path of fluid communication having a plurality of axially spaced openings whereby the effective cross-sectional area of the sum of said third path of fluid communication is reduced as said piston nears the end of its downstroke, and wherein said third path of fluid communication permits a slower flow rate during the downstroke of said piston than said first path of fluid communication so that during an upstroke fluid will be directed from said first fluid pathway through said second fluid pathway to said reservoir and from said reservoir through said third pathway of fluid communication and into said second bore, and during a piston downstroke, fluid exits said second bore through said first path of fluid communication in said piston;
   a one-way valve positioned in said first path of fluid communication which permits flow toward said first bore but does not permit flow in the opposite direction;
   a remotely adjustable control valve positioned in said hydraulic fluid circuit; and
   a spring surrounding said rod and said cylinder connected at one end to said first base and disposed to hold said piston at an intermediate position in said cylinder.

2. An assembly as recited in claim 1 wherein:
   (a) said spring is an air bag and
   (b) further comprising a fourth path of fluid communication for communicating air under pressure to and from said air bag.

3. An assembly as recited in claim 2 wherein said fourth path of fluid communication passes through said first base.

4. An assembly as recited in claim 2 wherein:
   (a) said air bag is connected at one end to said second base;
   (b) said second base has an external neck adjacent to said air bag; and
   (c) said air bag is designed so that, when it expands, it expands into said neck.

5. An assembly as recited in claim 4 wherein:
   (a) said second base comprises two components which are threaded together;
   (b) said air bag is connected to one of said components; and
   (c) said cylinder is mounted on the other of said components.

6. An assembly as recited in claim 1 wherein said rod is mounted on said first base by means of a universal joint.

7. An assembly as recited in claim 1 wherein said reservoir is located in said second base.

8. An assembly as recited in claim 1 wherein a housing surrounds said piston and defines said reservoir for hydraulic fluid between said housing and said cylinder.

9. An assembly as recited in claim 8 wherein said housing is threadedly mounted on said second base.

10. An assembly as recited in claim 1 wherein said assembly additionally comprises a cab member mounted on an elongated chassis member for pivotal movement about an axis transverse to the longitudinal axis of said chassis member from a lowered first position to a raised second position.

11. An assembly as recited in claim 10 wherein said assembly is mounted on said cab member.

* * * * *